United States Patent [19]

Callander

[11] 4,433,077

[45] Feb. 21, 1984

[54] PROCESS FOR PREPARING CURABLE COMPOUNDS

[75] Inventor: Keith A. Callander, Sarnia, Canada

[73] Assignee: Polysar Limited, Sarnia, Canada

[21] Appl. No.: 410,654

[22] Filed: Aug. 23, 1982

[30] Foreign Application Priority Data

Sep. 23, 1981 [CA] Canada .................................... 386486

[51] Int. Cl.³ .............................................. C08L 93/04
[52] U.S. Cl. ..................................... 523/344; 524/272; 524/297; 524/533; 525/263; 525/305
[58] Field of Search ................ 523/344; 524/477, 297, 524/512, 272, 533; 525/305, 263

[56] References Cited

U.S. PATENT DOCUMENTS

| | | | |
|---|---|---|---|
| 2,325,946 | 8/1943 | Garvey, Jr. ........................... | 524/297 |
| 2,449,058 | 9/1948 | Coes, Jr. .............................. | 524/297 |
| 2,611,753 | 9/1952 | Burrell et al. ........................ | 524/272 |
| 3,632,677 | 1/1972 | Petner et al. ......................... | 525/305 |
| 3,757,828 | 9/1973 | Frauenglass et al. ............... | 525/305 |
| 4,244,852 | 1/1981 | Prem et al. ........................... | 524/297 |

FOREIGN PATENT DOCUMENTS 714414  8/1954  United Kingdom ................ 524/512

*Primary Examiner*—Joseph L. Schofer
*Assistant Examiner*—N. Sarofim
*Attorney, Agent, or Firm*—Stevens, Davis, Miller & Mosher

[57] ABSTRACT

A process is provided for the production of soft compounds which are curable by heat to rubbery elastomers which process comprises mixing in a trough type blade mixer a butadiene-acrylonitrile polymer, filler, tackifying resin, plasticizer, a polymerizable monomer and an organic peroxidic compound. The soft compounds may be used as gunnable or spreadable compounds or for gasketing or jointing purposes and cured in situ.

7 Claims, No Drawings

PROCESS FOR PREPARING CURABLE COMPOUNDS

This invention is directed to a process for the manufacture of soft curable compounds, which compounds contain butadiene-acrylonitrile polymer, and which may be used, for example, as gunnable or spreadable compounds or in laminates or as repair and jointing compounds.

Butadiene-acrylonitrile polymers are well known in the art and are generally made by emulsion free radical polymerization to produce rubbery polymers which are well known for their solvent and oil resistant properties when made into vulcanizates. Due to the polar nature of such polymers, plasticizers for the polymer generally are polar in nature and may be selected from various esters, certain aromatic compounds and other polar materials. Such plasticizers are generally added to the polymer to soften it thereby improving the mixing and processing, and to improve the low temperature flexibility. Butadiene-acrylonitrile polymers may be compounded with the conventional fillers - in the resulting vulcanizates, the carbon blacks provide reinforcement, silica and silicates provide reasonable reinforcement and treated carbonates and clay provide some degree of reinforcement. Diatomaceous earth, talc, barytes and untreated carbonates provide little reinforcement. Vulcanization active agents useable with these polymers include sulphur and sulphur-containing compounds and organic peroxides. Crosslinkable monomers, such as various acrylate compounds, may also be used in the compounding of butadiene-acrylonitrile polymers, although the level used of such crosslinkable monomers is generally quite low, such as from about two or three parts up to about ten or fifteen parts by weight per one hundred parts by weight of polymer. Butadiene-acrylonitrile polymers are generally mixed with any or all of the above materials in an internal rotary mixer or on a rubber mill wherein the necessary high shear can be achieved in order to achieve adequate mixing.

It is an objective of the present invention to provide a process for the manufacture of soft compounds containing butadiene-acrylonitrile polymers which are curable by heat to rubbery elastomers.

In accordance with the invention, there is provided a process for the production of soft compounds which are curable by heat to rubbery elastomers which process comprises adding to a trough type blade mixer one or more inorganic fillers, organic tackifying resin, a butadiene-acrylonitrile polymer and an organic peroxidic compound polymerizable monomer having two or three polymerizable carbon-carbon double bonds, said trough type blade mixer being selected from the group consisting of sigma-blade mixers, Z-blade mixers, horizontal dispersion-blade mixers and double Naben-blade mixers, initiating the mixing in said mixer, then adding to said mixer organic plasticizer and continuing said mixing, then adding an organic peroxidic compound and continuing said mixing, said mixing being at a temperature of from about 20° to about 50° C., and removing the final mixture from said mixer as an essentially homogeneous soft compound.

The butadiene-acrylonitrile polymers used in this invention include the conventional free radical emulsion polymerized polymers, may have an acrylonitrile content of from about 15 up to about 40 weight percent, may contain from 0 up to about 50 parts by weight per 100 parts by weight of polymer of a plasticizer such as di-octyl phthalate and may have a molecular weight, expressed as the Mooney (ML 1+4@100° C.), of from about 35 to about 70.

The inorganic filler of this invention may be selected from those generally known in the art including, for example, silica, calcium silicate, calcium carbonate, clay (e.g. aluminum silicate), talc and the like and mixtures thereof. Preferred are silica and calcium carbonate. The amount of inorganic filler used, based on 100 parts by weight of butadiene-acrylonitrile polymer, may be from about 50 to about 200 parts by weight, preferably from about 100 to about 200 parts by weight.

The organic tackifying resin may be selected from those known in the art to be compatible with butadiene-acrylonitrile polymers including the terpene-phenolic resins, terpene polymers, alkylphenol-formaldehyde resins and the glycerol or pentaerythritol esters of rosin or of hydrogenated rosins. Preferred among these tackifying resins are the non-heat reactive resins such as the alkylphenol-formaldehyde resins and the terpene-phenolic resins. The amount of organic tackifying resin used, based on 100 parts by weight of butadiene-acrylonitrile polymer, may be from about 10 to about 50 parts by weight, preferably from about 20 to about 40 parts by weight. The organic plasticizer used in this invention may be selected from those known in the art to be compatible with butadiene-acrylonitrile polymers and includes the various organic esters such as di-2-ethylhexyl phthalate or sebacate, di-butyl or di-butoxyethyl phthalate or sebacate or adipate and di-butoxy-ethoxy-ethyl formal. Preferred organic plasticizers are those which contribute low temperature properties to the compound and include di-butoxy-ethoxy-ethyl formal, di-butoxyethyl phthalate and di-2-ethylhexyl phthalate. The quantity of plasticizer used, based on 100 parts by weight of butadiene-acrylonitrile polymer, may be from about 5 to bout 40 parts by weight, preferably from about 15 to about 30 parts by weight.

The organic peroxidic compound is selected from those well known in the art - one of average skill in the art will readily be able to select the compound bearing in mind the temperature that will be used for curing and the known temperature-half life characteristics of the various compounds. Such organic peroxidic compounds include organic peroxides, organic hydroperoxides and organic peresters. Preferred organic peroxidic compounds are the organic peroxides including benzoyl peroxide, dicumyl peroxide and lucidyl peroxide, which may be used as essentially pure compounds or admixed with inert inorganic compounds such as dicumyl peroxide/calcium carbonate mixtures. The quantity of such organic peroxidic compounds may be, per 100 parts by weight of butadiene-acrylonitrile polymer, from about 0.5 to about 5 parts by weight, preferably from about 0.5 to about 3 part by weight, based on the organic peroxidic compound.

The organic peroxidic compound polymerizable organic monomer having two or three polymerizable carbon-carbon double bonds may be selected from various esters of di- or tri-acrylate or methacrylate, such as ethylene glycol di-acrylate or di-methacrylate, tetraethylene glycol di-acrylate or di-methacrylate, 1,3-butylene glycol di-acrylate or di-methacrylate, tri-methylol propane tri-acrylate or tri-methacrylate and pentaerythritol tri-acrylate or tri-methacrylate. The amount of such polymerizable organic monomer may be, per 100 parts by weight of butadiene-acrylonitrile polymer, from about 20 to about 60 parts by weight, preferably from about 25 to about 50 parts by weight.

In the process of the present invention, the component materials which include the viscous polymer, the filler particulate solids and the low viscosity fluid materials must be mixed in a mixer which provides suitable conditions to cause adequate mixing together of the component materials. It is most surprising that a polymer can be mixed with the fluid and solid components described to provide an essentially homogeneous mixture—those of average skill in the art believed that no mixing would occur because of the great differences in viscosity between the components. Certain trough type blade mixers have been found to be suitable for the production of the present compounds. Suitable such trough type blade mixers include sigma-blade mixers, Z-blade mixers, horizontal dispersion-blade mixers and double Naben-blade mixers, all of which comprise a horizontal tank or mixing chamber having therein a shaft equipped with tangential or overlapping blades driven by an external motor. Such mixers usually have two such blades in a tangential or overlapping configuration to provide the necessary kneading, shearing and dispersion of the components within the mixer. The chambers of such mixers may be open or closed, are operated at about atmospheric pressure and preferably are equipped with temperature control means such as jackets suppliable with hot or cold water. Such mixers are not equipped with means to apply pressure to the contents while being mixed in contrast to the rotary internal mixers normally used in the rubbery industry. Other mixers known in the art and including internal mixers, rubber mills, tumble blenders, air and gravity feed mixers and horizontal ribbon type spiral-blade trough mixers will not cause mixing of the components and are therefore not suitable for use in the process of the present invention. Suitable such mixers, as described above, are commercially available from many suppliers. Such mixers will provide the mixing conditions necessary whereas conventional rubber compounding equipment such as a rubber mill or Banbury will not cause mixing to occur adequately.

Accordingly, in the present process the inorganic filler, organic tackifying resin, butadiene-acrylonitrile polymer (which may have been cut into chunks) and the organic peroxidic compound polymerizable monomer having two or three polymerizable carbon-carbon double bonds are added to the mixer and the rotatable blades are set into motion to initiate the mixing. After mixing for a period of time, which is preferably from about 5 to about 30 minutes, an organic plasticizer is added and the mixing continued, preferably for a further time of from about 5 to about 30 minutes, following which an organic peroxidic compound is added and the mixing continued, preferably for a further time of from about 5 to about 30 minutes. The mixer is maintained at a temperature within the range of about 20° to about 50° C., especially for the time when the organic peroxidic compound is being mixed. At the completion of the mixing, the mixture is removed from the mixer as an essentially homogeneous soft compound. The mixture may have a softness, as measured by the ASTM method C 782-74, softness of preformed sealing tapes, which uses a needle penetrometer, of from about 50 up to about 150. The mixture has a fairly high level of tack, may be extruded readily even at temperatures as low as 25° C. and is not subject to separation of any of the individual components on storage.

The mixture may be readily vulcanized by heat, for example by heating to a temperature of from about 125° to about 200° C. for times of from about 2 minutes up to about 8 hours. Preferably, vulcanization is achieved by heating at a temperature of from about 150° to about 200° C. for a time of from about 5 to about 60 minutes.

The mixture may be applied as a sheet to a fabric substrate and vulcanized thereon or may be applied as a gunnable or spreadable compound to a metal, glass or fabric substrate and vulcanized thereon or may be used as a gasketing material or for jointing or repairing of, for example, belting and vulcanized in situ. The vulcanizates obtained by vulcanizing the mixtures of the invention generally are fairly soft, have reasonable strength properties, have good adhesion to almost any substrate to which they have been applied before vulcanization, are flexible over a wide temperature range including to temperatures as low as $-40°$ C. and retain reasonable strength properties on ageing.

The following examples serve to illustrate but not limit the invention. All parts are parts by weight unless specified.

EXAMPLE 1

A Baker Perkins mixer equipped with dispersion blades, i.e. a horizontal dispersion-blade mixer, and having a mixing chamber capacity of about 0.55 liters was used. The mixing chamber was fitted with an external jacket in which cooling water was circulated during the time that the dicumyl peroxide compound was being mixed, in order to maintain the temperature below about 50° C. In operation, the front blade was set at 38 rpm and the back blade was set at 72 rpm. Using the materials shown in Table I, those shown as Part A were added at zero time, following which the mixing was inititated. At 10 minutes, Part B was added while mixing was continued and at 20 minutes Part C was added. Mixing was terminated at 30 minutes and the mixture removed. Portions of each mixture were tested for softness by the method ASTM C 782-74. Portions of each mixture were formed into sheets, vulcanized by heating at 190° C. for 10 minutes and the vulcanizate properties were determined using the well known ASTM procedures. The results are shown in Table I and illustrate that soft compounds are readily produced by the present process and that the compounds are vulcanizable by heat to yield rubbery elastomers.

TABLE I

|  |  | Experiment # | | | | |
|---|---|---|---|---|---|---|
|  | Part | 1 | 2 | 3 | 4 | 5 |
| Filler A | A | 150 | — | — | — | — |
| Filler B | A | — | 55 | — | — | — |
| Filler C | A | — | — | 145 | — | — |
| Filler D | A | — | — | — | 144 | — |
| Filler E | A | — | — | — | — | 158 |
| Tackifying Resin | A | 30 | 30 | 30 | 30 | 30 |
| Antioxidant | A | 1 | 1 | 1 | 1 | 1 |
| Polymerizable Monomer | A | 40 | 40 | 40 | 40 | 40 |
| Polymer | A | 100 | 100 | 100 | 100 | 100 |
| Plasticizer | B | 20 | 20 | 20 | 20 | 20 |
| Peroxide | C | 1.5 | 1.5 | 1.5 | 1.5 | 1.5 |
| Mixture Softness (ASTM C 782-74) |  | 86 | 75 | 65 | 75 | 70 |
| Vulcanizate Properties: |  |  |  |  |  |  |
| Hardness | Shore A | 57 | 58 | 64 | 63 | 64 |
| 100% Modulus | MPa | 2 | 2.15 | 2.85 | 1.3 | 2.9 |
| 300% Modulus | MPa | 3.75 | 8.05 | 5.1 | 3.7 | — |
| Tensile Strength | MPa | 5.35 | 8.1 | 5.15 | 7.8 | 4.75 |

TABLE I-continued

|  |  | Experiment # | | | | |
|---|---|---|---|---|---|---|
|  |  | 1 | 2 | 3 | 4 | 5 |
| Elongation | % | 380 | 310 | 320 | 490 | 360 |
| Tear (DieC) | kN/m | 26.5 | 54 | 25.5 | 21.6 | 21.6 |
| Brittle Point | °C. | −40 | −44 | −31 | −35 | −35 |

Notes:
Filler A — calcium carbonate — ATOMITE
Filler B — amorphous silica — HISIL EP
Filler C — hard clay — DIXIE Clay
Filler D — coated calcium carbonate — WINNOFIL S
Filler E — talc — I.T. Talc 3X
Antioxidant - 2,2′-methylene-bis(4-methyl-6-tert.-butyl phenol)
Tackifying Resin - alkyl-phenol formaldehyde resin - Resin SP 12
Polymerizable Monomer - difunctional acrylic monomer - Monomer X970
Plasticizer - di(butoxy-ethoxy-ethyl) formal - TP90B
Peroxide - 40% active dicumyl peroxide on calcium carbonate - DICUP 40C
Polymer - butadiene-acrylonitrile polymer containing about 20 weight per cent acrylonitrile and having a Mooney (ML 1+4 @100° C.) of about 65.
ATOMITE, HISIL, DIXIE, WINNOFIL, and DICUP are registered Trade Marks.

EXAMPLE 2

Following the procedure of Example 1 and using the materials identified therein, further compositions were prepared, vulcanized and tested. The compositions and results are shown in Table 2, the vulcanizates having been prepared by heating for 10 minutes at 190° C.

TABLE 2

|  |  | Experiment # | | | | |
|---|---|---|---|---|---|---|
|  |  | 1 | 2 | 3 | 4 | 5 |
|  | Part |  |  |  |  |  |
| Filler A | A | 200 | 200 | 200 | 200 | 200 |
| Tackifying Resin | A | 30 | 40 | 40 | 40 | 40 |
| Polymerizable |  |  |  |  |  |  |
| Monomer-A | A | 30 | 40 |  |  |  |
| Monomer-B | A |  |  | 40 |  |  |
| Monomer-C | A |  |  |  | 40 |  |
| Monomer-D | A |  |  |  |  | 40 |
| Polymer | A | 100 | 100 | 100 | 100 | 100 |
| Plasticizer | B | 20 | 20 | 20 | 20 | 20 |
| Peroxide | C | 1.5 | 1.5 | 1.5 | 1.5 | 1.5 |
| Mixture Softness |  | 65 | 63 | 72 | 76 | 78 |
| Vulcanizate Properties: |  |  |  |  |  |  |
| Hardness | Shore A | 56 | 61 | 57 | 60 | 65 |
| 100% Modulus | MPa | 1.5 | 1.6 | 1.3 | 1.6 | 3.4 |
| 300% Modulus | MPa | 2.2 | 2.6 | 2.8 | — | — |
| Tensile Strength | MPa | 4.1 | 4.1 | 3.9 | 3.2 | 4.7 |
| Elongation | % | 500 | 500 | 400 | 250 | 250 |

What is claimed is:

1. A process for the production of soft compounds which are curable by heat to rubbery elastomers which process comprises the steps of:
    adding to a trough type blade mixer one or more inorganic fillers, organic tackifying resin, a butadiene-acrylonitrile polymer and an organic peroxidic compound polymerizable monomer having two or three polymerizable carbon-carbon double bonds, said trough type blade mixer being selected from the group consisting of sigma-blade mixers, Z-blade mixers, horizontal dispersion-blade mixers and double Naben-blade mixers,
    initiating the mixing in said mixer and continuing mixing for a time of from about 5 to about 30 minutes,
    then adding to said mixer organic plasticizer and continuing mixing for a time of from about 5 to about 30 minutes,
    then adding to said mixer an organic peroxidic compound and continuing mixing for a time of from about 5 to about 30 minutes,
    said mixing being at a temperature of from about 20° to about 50° C.,
    and removing the final mixture from said mixer as an essentially homogeneous soft compound.

2. The process of claim 1 wherein the butadiene-acrylonitrile polymer contains from about 15 to about 40 weight percent of acrylonitrile and has a Mooney (ML 1+4@100° C.) of from about 35 to about 70 and wherein the inorganic filler is selected from the group consisting of silica, calcium silicate, calcium carbonate, clay, talc and mixtures thereof and is present in an amount of from about 50 to about 200 parts by weight per 100 parts by weight of butadiene-acrylonitrile polymer.

3. The process of claim 1 wherein the organic tackifying resin is selected from the group consisting of terpene-phenolic resins, terpene polymers, alkylphenol-formaldehyde resins and the glycerol or pentaerythritol esters of rosin or of hydrogenated rosin and is present in an amount of from about 10 to about 50 parts by weight per 100 parts by weight of butadiene-acrylonitrile polymer.

4. The process of claim 1 wherein the organic plasticizer is selected from the group consisting of di-2-ethylhexyl phthalate or sebacate, di-butyl or di-butoxyethyl phthalate, sebacate or adipate and di-butoxy-ethoxy-ethyl formal and is present in an amount of from about 5 to about 40 parts by weight per 100 parts by weight of butadiene-acrylonitrile polymer.

5. The process of claim 1 wherein the organic peroxidic compound polymerizable monomer having two or three polymerizable carbon-carbon double bonds is selected from the group consisting of ethylene glycol di-acrylate or di-methacrylate, tetraethylene glycol di-acrylate or di-methacrylate, 1,3-butylene glycol di-acrylate or di-methacrylate, tri-methylol propane tri-acrylate or tri-methacrylate and pentaerythritol tri-acrylate or tri-methacrylate and is present in an amount of from about 20 to about 60 parts by weight per 100 parts by weight of butadiene-acrylonitrile polymer.

6. The process of claim 1 wherein the amount of organic peroxidic compound is from about 0.5 to about 5 parts by weight per 100 parts by weight of butadiene-acrylonitrile polymer.

7. The process of claim 6 wherein the organic peroxidic compound is selected from the group consisting of benzoyl peroxide, dicumyl peroxide and lucidyl peroxide.

* * * * *